United States Patent [19]

Wilson et al.

[11] Patent Number: 4,832,899
[45] Date of Patent: * May 23, 1989

[54] MECHANICAL SPECTRAL SHIFT REACTOR

[75] Inventors: John F. Wilson, Murrysville; Donald G. Sherwood, Monroeville, both of Pa.

[73] Assignee: Westinghouse Electric Corp., Pittsburgh, Pa.

[*] Notice: The portion of the term of this patent subsequent to Dec. 29, 2004 has been disclaimed.

[21] Appl. No.: 884,333

[22] Filed: Jul. 11, 1986

Related U.S. Application Data

[60] Division of Ser. No. 564,364, Dec. 22, 1983, continuation of Ser. No. 217,275, Dec. 16, 1980, abandoned.

[51] Int. Cl.$^4$ .............................................. G21C 7/26
[52] U.S. Cl. .................................. 376/209; 376/220; 376/327
[58] Field of Search ............... 376/209, 307, 353, 333, 376/220, 328, 339, 346, 350, 351

[56] References Cited

U.S. PATENT DOCUMENTS

| | | |
|---|---|---|
| 2,999,059 | 9/1961 | Treshow . |
| 3,036,964 | 5/1962 | Horning . |
| 3,163,581 | 12/1964 | Campbell .......................... 376/333 |
| 3,194,743 | 7/1965 | Reddens et al. . |
| 3,205,144 | 9/1965 | Jabsen ................................ 376/209 |
| 3,255,086 | 6/1966 | Hitchcock ......................... 376/333 |
| 3,365,368 | 1/1968 | Fray ................................... 376/333 |
| 3,481,832 | 12/1969 | Rickert ............................... 376/353 |
| 3,595,748 | 7/1971 | Frish et al. ........................ 376/353 |
| 3,625,816 | 12/1971 | Aleite et al. ...................... 376/333 |
| 3,713,971 | 1/1973 | Van Santen et al. ............. 376/333 |
| 3,734,825 | 5/1973 | Schabert et al. .................. 376/353 |
| 3,849,257 | 11/1974 | Bevilacqua ........................ 376/353 |

FOREIGN PATENT DOCUMENTS

| | | |
|---|---|---|
| 52-17190 | 8/1977 | Japan . |
| 53-57390 | of 1978 | Japan . |
| 998540 | 7/1965 | United Kingdom ............... 376/209 |
| 1114285 | 5/1968 | United Kingdom ............... 376/209 |

OTHER PUBLICATIONS

Nuclear Eng. Int., vol. 16, No. 185, Oct. 1971, pp. 857–859, Heil.
Nuclear Engineering International, Aug. 1973, pp. 646–649.

Primary Examiner—Harvey E. Behrend
Attorney, Agent, or Firm—D. C. Abeles

[57] ABSTRACT

The mechanical spectral shift reactor comprises a reactive core having fuel assemblies accommodating both water displacer elements and control rods for selectively changing the volume of water-moderator in the core. The fuel assemblies are arranged in alternating fashion so that one drive mechanism may move displacer elements in more than one fuel assembly without interfering with the movement of control rods or the corresponding control rod drive mechanisms.

24 Claims, 9 Drawing Sheets

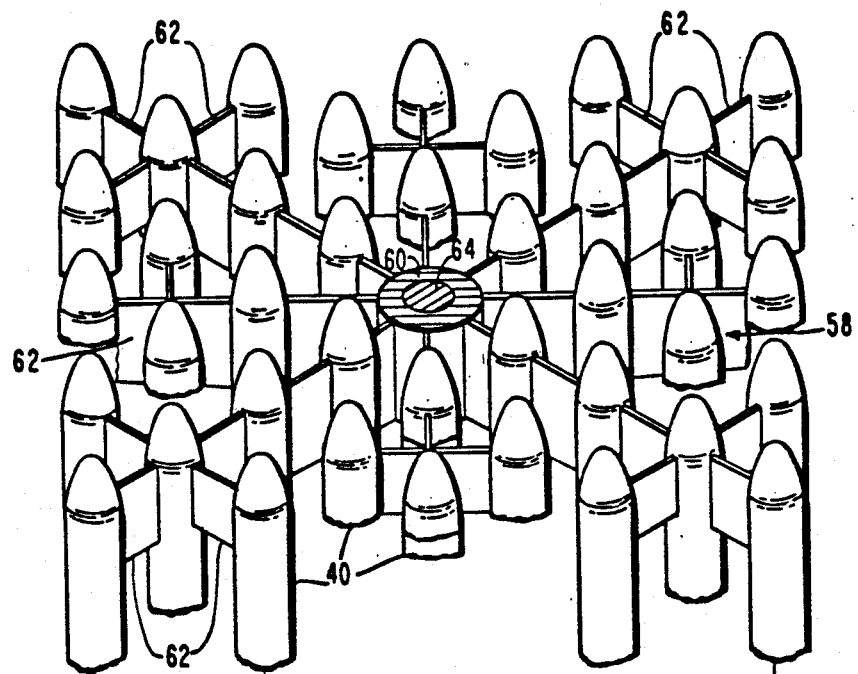
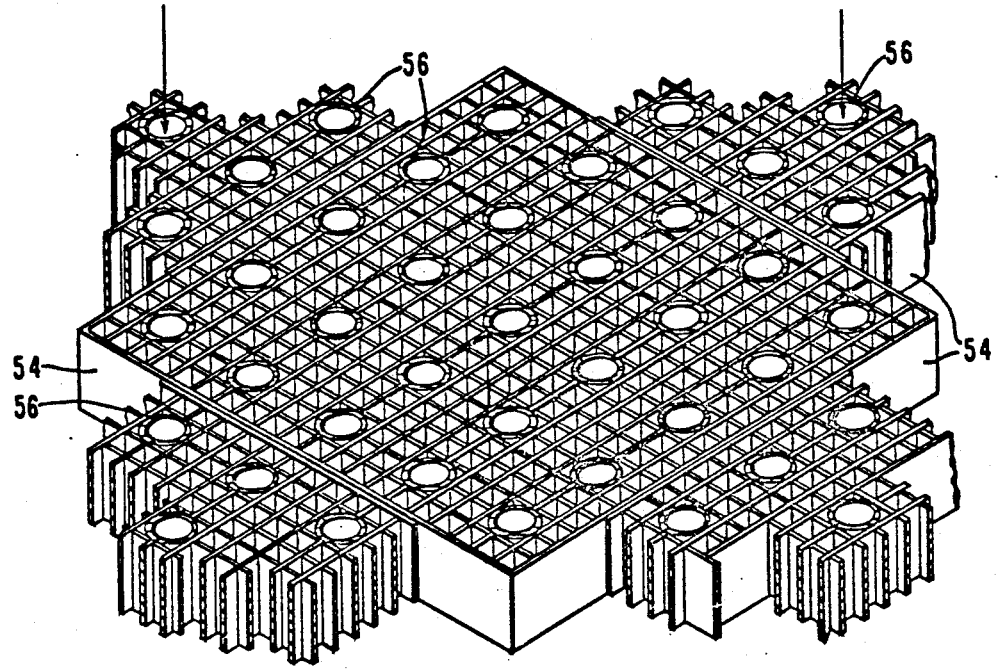
FIG. 4

MECHANICAL SPECTRAL SHIFT REACTOR

CROSS-REFERENCE TO RELATED APPLICATIONS

This is a division of application Ser. No. 06/564,364 filed Dec. 22, 1983, which is a continuation of Ser. No. 06/217,275, filed Dec. 16, 1980, now abandoned.

This application is related to copending applications Ser. No. 565,513 entitled "Mechanical Spectral Shift Reactor" by W. J. Dollard et al. now abandoned; Ser. No. 217,056 entitled "Latching Mechanism" by L. Veronesi; now U.S. Pat. No. 4,439,054 dated Mar. 27, 1984 217,054 entitled "Spectral Shift Reactor Control Method" by A. J. Impink, Jr. now U.S. Pat. No. 4,432,930; Ser. No. 217,061 entitled "Spectral Shift Reactor" by W. R. Carlson et al. now abandoned; Ser. No. 217,052 entitled "Displacer Rod For Use In A Mechanical Spectral Shift Reactor" by R. K. Gjertsen et al. now Ser. No. 4,432,934; dated Feb. 21, 1984 No. 217,053 entitled "Mechanical Spectral Shift Reactor" by D. G. Sherwood et al. now abandoned; Ser. No. 217,055 entitled "Hydraulic Drive Mechanism" by L. Veronesi et al. now Pat. No. 4,550,941 dated Nov. 5, 1985; Ser. No. 217,059 entitled "Fuel Assembly For A Nuclear Reactor" by R. K. Gjersten now U.S. Pat. No. 4,381,284 dated Apr. 26, 1983; and Ser. No. 217,051 entitled "Fuel Assembly For A Nuclear Reactor" by R. K. Gjersten et al. now U.S. Pat. No. 4,418,036 dated Nov. 29, 1983, all of which are filed herewith and to Ser. No. 228,007 entitled "Self-Rupturing Gas Moderator Rod For A Nuclear Reactor" by G. R. Marlatt, filed Jan. 23, 1981, now U.S. Pat. No. 4,371,495 dated Feb. 1, 1983, all of which are assigned to the Westinghouse Electric Corporation.

BACKGROUND OF THE INVENTION

The invention relates to spectral shift reactor control and more particularly to mechanical means for spectral shift reactor control.

In typical nuclear reactors, reactivity control is accomplished by varying the amount of neutron absorbing material (poisons) in the reactor core. Generally, neutron absorbing control rods are utilized to perform this function by varying the number and location of the control rods with respect to the reactor core. In addition to control rods, burnable poisons and poisons dissolved in the reactor coolant can be used to control reactivity.

In the conventional designs of pressurized water reactors, an excessive amount of reactivity is designed into the reactor core at start-up so that as the reactivity is depleted over the life of the core the excess reactivity may be employed to lengthen the core life. Since an excessive amount of reactivity is designed into the reactor core at the beginning of core life, neutron absorbing material such as soluble boron must be placed in the core at that time in order to properly control the excess reactivity. Over the core life, as reactivity is consumed, the neutron absorbing material is gradually removed from the reactor core so that the original excess reactivity may be used. While this arrangement provides one means of controlling a nuclear reactor over an extended core life, the neutron absorbing material used during core life absorbs neutrons and removes reactivity from the reactor core that could otherwise be used in a more productive manner such as in plutonium fuel production. The consumption of reactivity in this manner without producing a useful product results in a less efficient depletion of uranium and greater fuel costs than could otherwise be achieved. Therefore, it would be advantageous to be able to extend the life of the reactor core without suppressing excess reactivity with neutron absorbing material thereby providing an extended core life with a significantly lower fuel cost.

One such method of producing an extended core life while reducing the amount of neutron absorbing material in the reactor core is by the use of "Spectral Shift Control". As is well understood in the art, in one such method the reduction of excess reactivity (and thus neutron absorbing material) is achieved by replacing a large portion of the ordinary reactor coolant water with heavy water. This retards the chain reaction by shifting the neutron spectrum to higher energies and permits the reactor to operate at full power with reduced neutron absorbing material. This shift in the neutron spectrum to a "hardened" spectrum also causes more of the $U^{238}$ to be converted to plutonium that is eventually used to produce heat. Thus, the shift from a "soft" to a "hard" spectrum results in more neutrons being consumed by $U^{238}$ in a useful manner rather than by poisons. As reactivity is consumed, the heavy wter is gradually replaced with ordinary water so that the reactor core reactivity is maintained at a proper level. By the end of core life, essentially all the heavy water has been replaced by ordinary water while the core reactivity has been maintained. Thus, the reactor can be controlled without the use of neutron absorbing material and without the use of excess reactivity at start-up which results in a significant uranium fuel cost savings. The additional plutonium production also reduces the $U^{235}$ enrichment requirements. While the use of heavy water as a substitute for ordinary water can be used to effect the "spectral shift", the use of heavy water can be an expensive and complicated technology.

While there exist in the prior art numerous ways of controlling a nuclear reactor, what is needed is apparatus for controlling reactor core moderation in a manner that provides for reduced uranium fuel costs and for an extended reactor core life.

SUMMARY OF THE INVENTION

The mechanical spectral shift reactor comprises a reactive core having fuel assemblies accommodating both water displacer elements and control rods for selectively changing the volume of water-moderator in the core. The fuel assemblies are arranged in alternating fashion so that one drive mechanism may move displacer elements in more than one fuel assembly without interfering with the movement of control rods or the corresponding control rod drive mechanisms.

BRIEF DESCRIPTION OF THE DRAWINGS

While the specification concludes with claims particularly pointing out and distinctly claiming the subject matter of the invention, it is believed the invention will be better understood from the following description taken in conjunction with the accompanying drawings, wherein:

FIG. 4 is a view in perspective of displacer rods and their respective fuel assembly;

FIG. 9 is an enlarged view of a portion of the quarter core;

DESCRIPTION OF THE PREFERRED EMBODIMENT

In the operation of a commercial pressurized water reactor it is desirable to be able to prolong the life of the reactor core to better utilize the uranium fuel thereby reducing the fuel costs. The invention described herein provides a means to extend reactor core life by controlling reactor core moderation.

Figure 1:
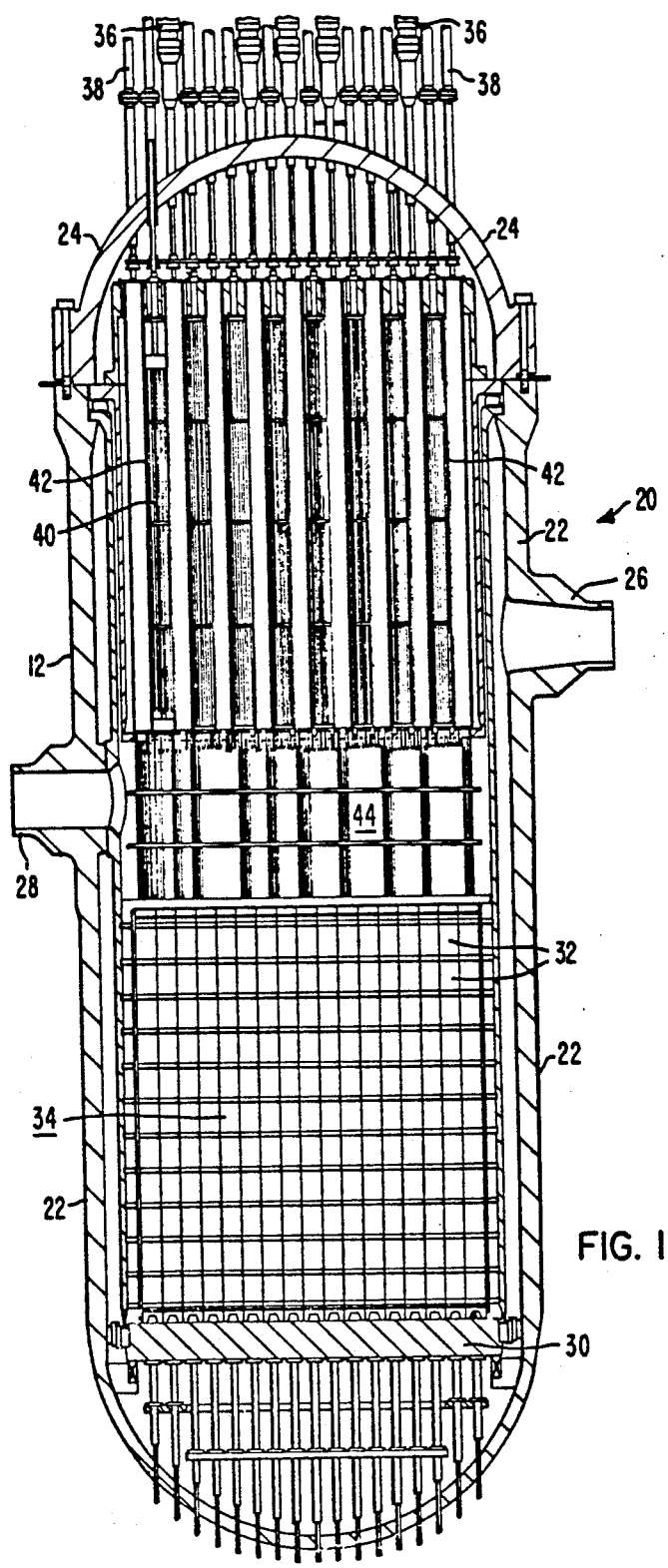
FIG. 1 is a cross-sectional view in elevation of the reactor vessel.

Referring to FIG. 1, the nuclear reactor is referred to generally as 20 and cmprises a reactor vessel 22 with a removable closure head 24 attached to the top end thereof. An inlet nozzle 26 and an outlet nozzle 28 are connected to reactor vessel 22 to allow a coolant such as water to circulate through reactor vessel 22. A core plate 30 is disposed in the lower portion of reactor vessel 22 and serves to support fuel assemblies 32. Fuel assemblies 32 are arranged in reactor vessel 22 and comprise reactor core 34. As is well understood in the art, fuel assemblies 32 generate heat by nuclear fissioning of the uranium therein. The reactor coolant flowing through reactor vessel 22 in heat transfer relationship with fuel assemblies 32 transfers the heat from fuel assemblies 32 to electrical generating equipment located remote from nuclear reactor 20. A plurality of control rod drive mechanisms 36 which may be chosen from those well known in the art are disposed on closure head 24 for inserting or withdrawing control rods (not shown) from fuel assemblies 32. In addition, a plurality of displacer rod drive mechanisms 38 are also disposed on closure head 24 for inserting or withdrawing displacer rods 40 from fuel assemblies 32. Displacer rod drive mechanism 38 may be similar to the one described in copending U.S. patent application Ser. No. 217,055, filed herewith in the name of L. Veronesi et al. entitled "Hydraulic Drive Mechanism" and assigned to the Westinghouse Electric Corporation now U.S. Pat. No. 4,550,941 dated Nov. 5, 1985. For purposes of clarity, only a selected number of displacer rods 40 are shown in FIG. 1. However, it should be understood, that the number of displacer rods 40 are chosen to correspond to the number of displacer rod guide tubes in fuel assemblies 32. A plurality of displacer rod guide structures 42 are located in the upper section of reactor vessel 22 with each being in alignment with a displacer rod drive mechanism 38 for guiding the movement of displacer rods 40 through the upper section of reactor vessel 22. A calandria 44 may be arranged between fuel assemblies 32 and displacer rod guide structures 42 and comprises a multiplicity of hollow stainless steel tubes arranged in colinear alignment with each displacer rod and control rod for providing guidance of the displacer rods and control rods through the calandria area and for minimizing flow induced vibrations in the displacer rods and control rods.

Figure 2:
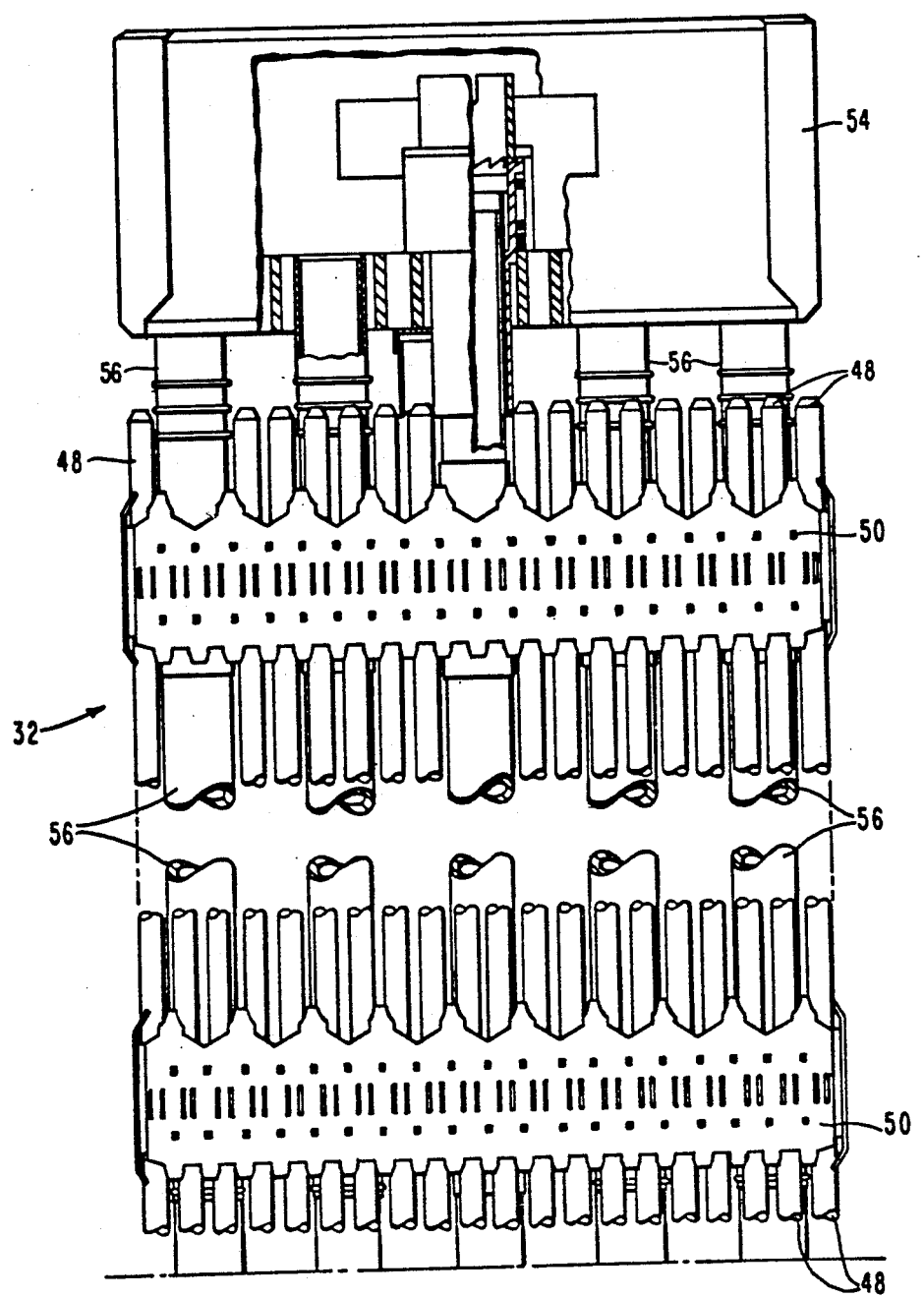
FIG. 2 is a cross-sectional view in elevation of the top portion of the fuel assembly.
Figure 3:
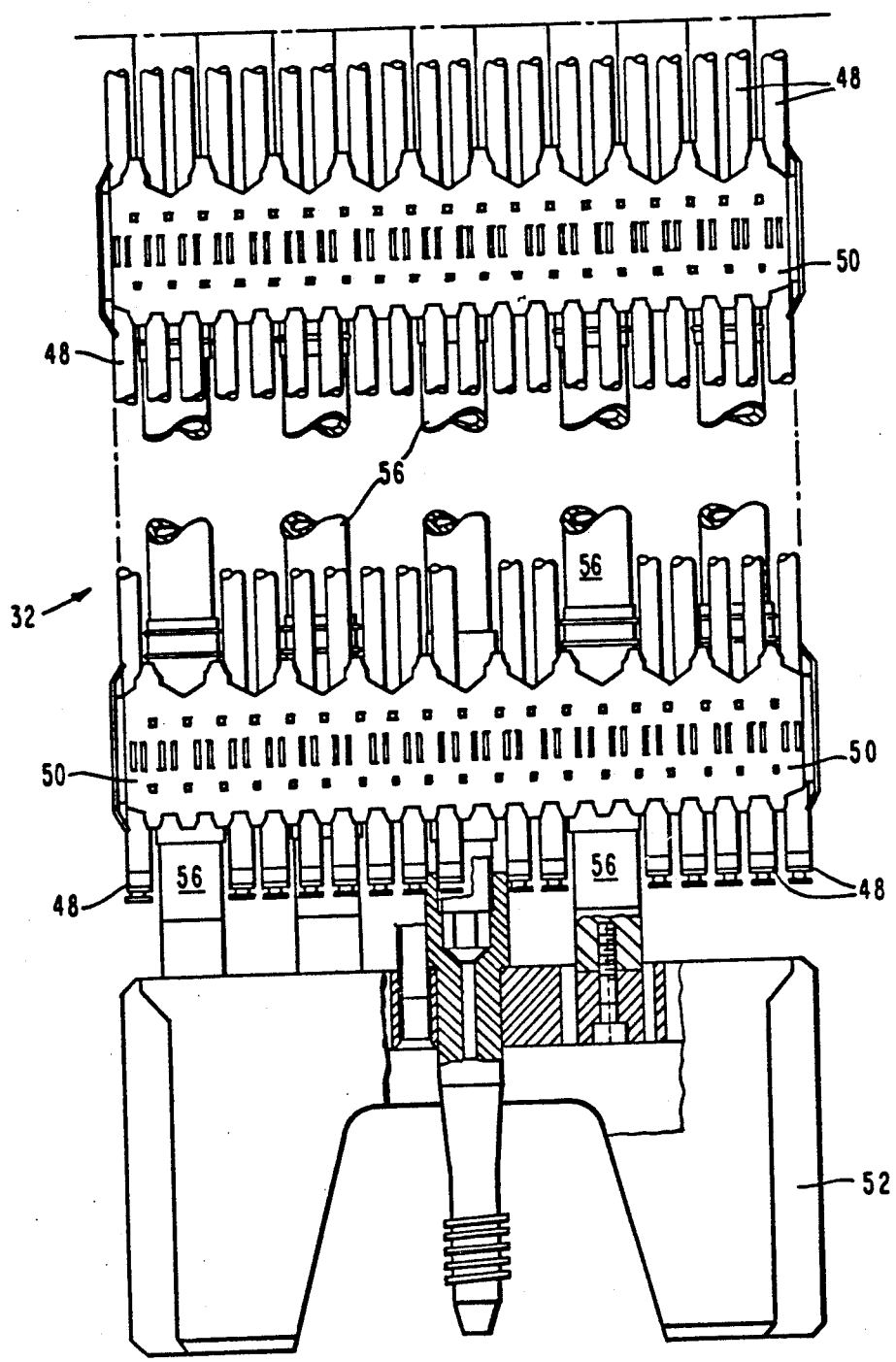
FIG. 3 is a cross-sectional view in elevation of the bottom portion of the fuel assembly.

Referring now to FIGS. 2–4, fuel assemblies 32 comprise fuel elements 48, grids 50, bottom nozzle 52, top nozzle 54, and guide tubes 56. Fuel elements 48 may be elongated cylindrical metallic tubes containing nuclear fuel pellets and having both ends sealed by end plugs. Fuel elements 48 may be arranged in a substantially 20×20 rectangular array and are held in place by grids 50. Guide tubes 56 which may number 25 are arranged in a generally 5×5 array within each fuel assembly 32. Each guide tube 56 occupies the space of about four fuel elements 48 and extend from bottom nozzle 52 to top nozzle 54 and provide a means to support grids 50, top nozzle 54 and bottom nozzle 52. Guide tubes 56 may be hollow cylindrical metallic tubes manufactured from Zircaloy and capable of accommodating rods such as displacer rods 40 or control rods. Displacer rods 40 and control rods are manufactured to be approximately the same size so that each guide tube 56 can equally accommodate either a displacer rod or a control rod. When not occupied by a rod, guide tubes 56 are filled with reactor coolant; however, when displacer rods 40 are inserted in guide tubes 56 displacer rods 40 displace the coolant therein.

Grids 50 are positioned at various locations along the length of fuel assembly 32 and serve to space fuel elements 48 and guide tubes 56 at appropriate distances from each other and to allow the reactor coolant to circulate in heat transfer relationship with fuel elements 48. A more detailed description of a similar grid may be found in U.S. Pat. Nos. 3,379,617 and 3,379,619, both issued in the name of H. N. Andrews et al. As can be seen in FIG. 4, displacer rods 40 are elongated cylindrical substantially hollow rods which can be manufactured out of Zircaloy and may be of the type described in copending U.S. patent application Ser. No. 217,052 entitled "Displacer Rod For Use In A Mechanical Spectral Shift Reactor" filed Dec. 16, 1980 in the name of R. K. Gjertsen et al. and assigned to the Westinghouse Electric Corporation, now U.S. Pat. No. 4,432,934 dated Feb. 21, 1984. Displacer rods 40 may also contain $ZrO_2$ or $Al_2O_3$ pellets for weighting the rod and enhancing its lowerability. As described in U.S. Pat. No. 4,432,934, the Zircaloy members 40 are thin-walled and can contain a filling of solid or annular zirconium oxide pellets or aluminum oxide pellets to provide structural support as well as mass. The construction of displacer rod 40 is such that is provides a low neutron absorbing rod that is capable of displacing reactor coolant-moderator when inserted into a fuel assembly. Displacer rods 40 are arranged so as to be in colinear alignment with guide tube 56 so that displacer rods 40 may be inserted in guide tubes 56 when it is desired. Displacer rods 40 are supported from a common attachment known as a spider 58. Spider 58 comprises a body 60 with struts 62 radially extending from body 60. Displacer rods 40 are individually attached to each strut 62 to form an array corresponding to the array of guide tubes 56 into which displacer rods may be inserted. Spider 58 is attached to drive shaft 64 which is connected to displacer rod drive mechanism 38. Activation of displacer rod drive mechanism 38 causes drive shaft 64 to be either lowered or raised thereby inserting or withdrawing displacer rods 40 from fuel assemblies 32 of core 34.

It is important to note that each spider 58 is arranged to be able to insert displacer rods 40 into more than one fuel assembly 32. For example, as shown in FIG. 4, spider 58 is capable of inserting 25 displacer rods in center fuel assembly 32 and 4 displacer rods in each of the adjacent 4 fuel assemblies. In this manner displacer rods 40 can be moved in and out of fuel assemblies 32 without increasing the number of spiders and drive mechanisms.

Figure 5:
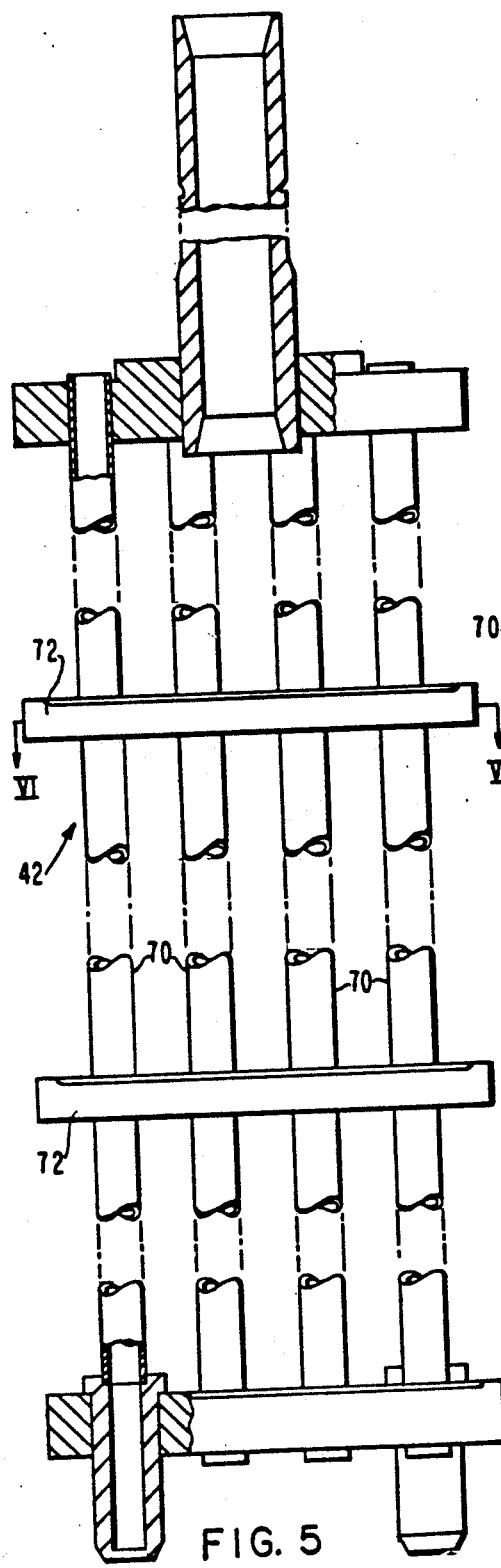
FIG. 5 is a cross-sectional view in elevation of a displacer rod guide structure.
Figure 6:
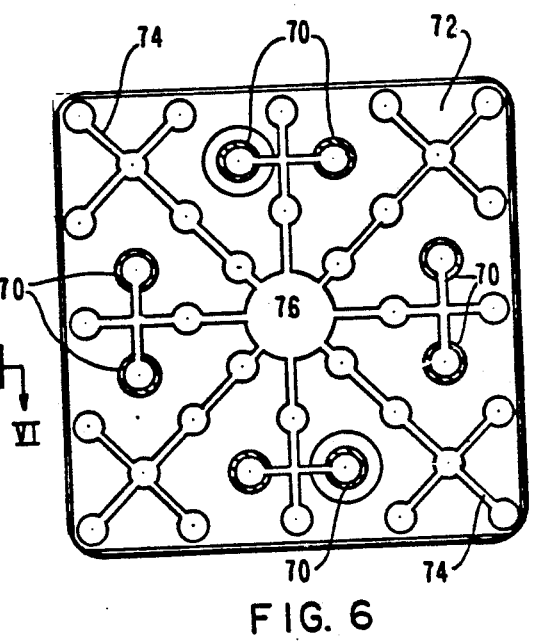
FIG. 6 is a view along line VI—VI of FIG. 5.

Referring now to FIGS. 5 and 6, displacer rod guide structures 42 comprise a plurality of split tube guides 70 which are designed to allow rods such as displacer rods or control rods to pass therethrough. Displacer rod guide structures 42 are located between calandria 44 and closure head 24 as shown in FIG. 1 and are arranged to correspond to each displacer rod drive mechanism 38. A number of spacers 72 are located at various locations along split tube guides 70 and together with split tube guides 70 serve to guide displacer rods 40 through the upper section of reactor vessel 22. As can be seen in FIG. 6, 8 split tube guides 70 may be provided for guiding displacer rods 40. The "split" in split tube guides 70 along with slots 74 in spacers 72 allow spider 58 to pass therethrough while maintaining alignment of the rods with guide tubes 56 in fuel assemblies 32. A center slot 76 is also provided for accommodating drive shaft 64 so that spider 58 may be moved therethrough.

Referring again to FIG. 1, calandria 44 which comprises a multiplicity of tubes provides guidance for the rods such as displacer rods 40 through the calandria area. In general, the tubes in calandria 44 are not split tubes, as are split tube guides 70, so that spider 58 stops its descent when spider 58 nears the top of the tubes in calandria 44. When stopped at the top of calandria 44 all rods extend through the calandria tubes and are fully inserted in fuel assembly 32. While inserted in the calandria tubes, the rods are protected from the flow of reactor coolant thereby minimizing vibrations that would otherwise be induced by the velocity of the reactor coolant in that area.

In the invention as described herein, at least three different types of rods are capable of being inserted into guide tubes 56. For example, displacer rods, control rods, and gray rods may be arranged to be inserted in guide tubes 56. All of the rods are approximately the same size and configuration, but because of the materials with which they are made serve different purposes. Displacer rods 40 which may be either a hollow thick walled tube or may contain a low neutron absorbing material such as $ZrO_2$ or $Al_2O_3$ pellets are used to displace reactor coolant and thereby control reactor moderation. Control rods contain neutron absorbing material as is well understood in the art and serve to control core reactivity in a commonly understood fashion. Gray rods are similar to displacer rods 40 but are made of an intermediate neutron absorbing material such as stainless steel so that their reactivity worth per rod is greater than that of displacer rods 40.

Figure 7:
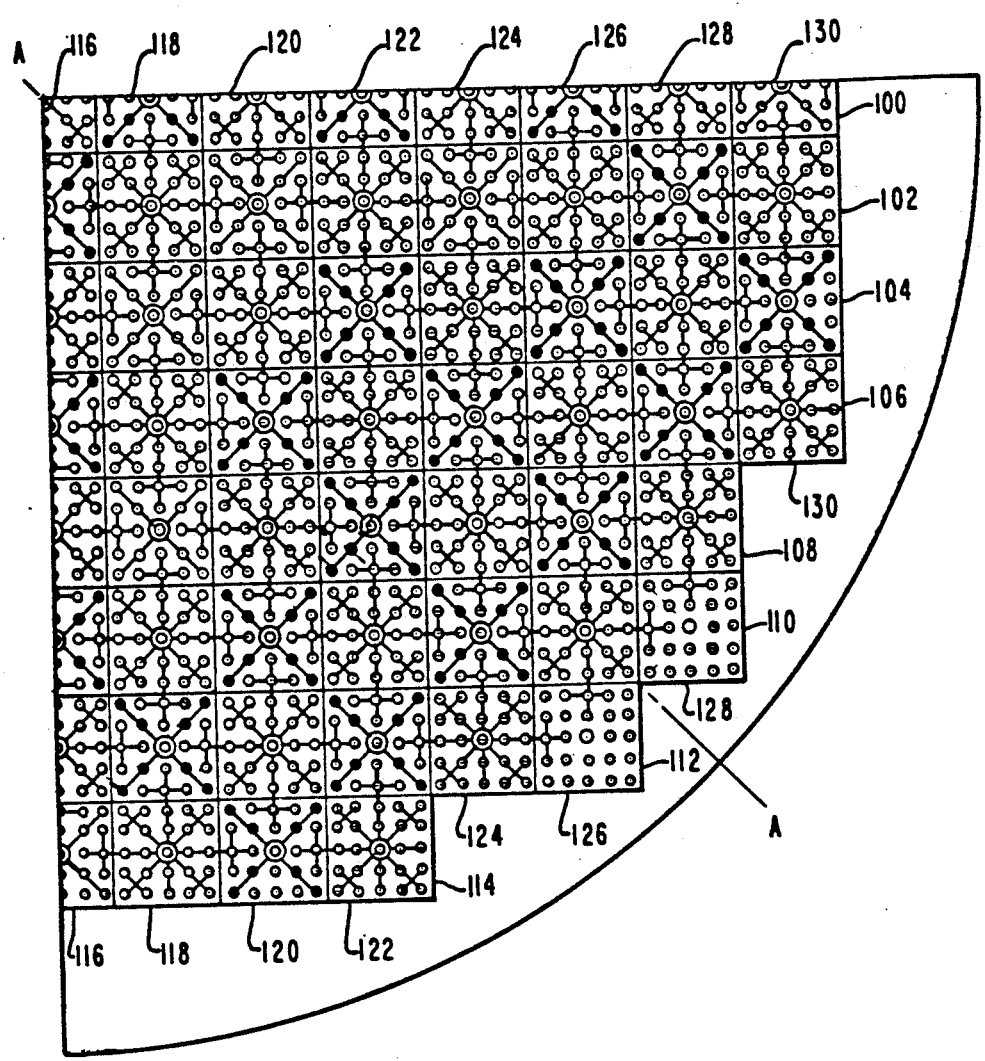
FIG. 7 is a diagram of a quarter core of the reactor.
Figure 8:
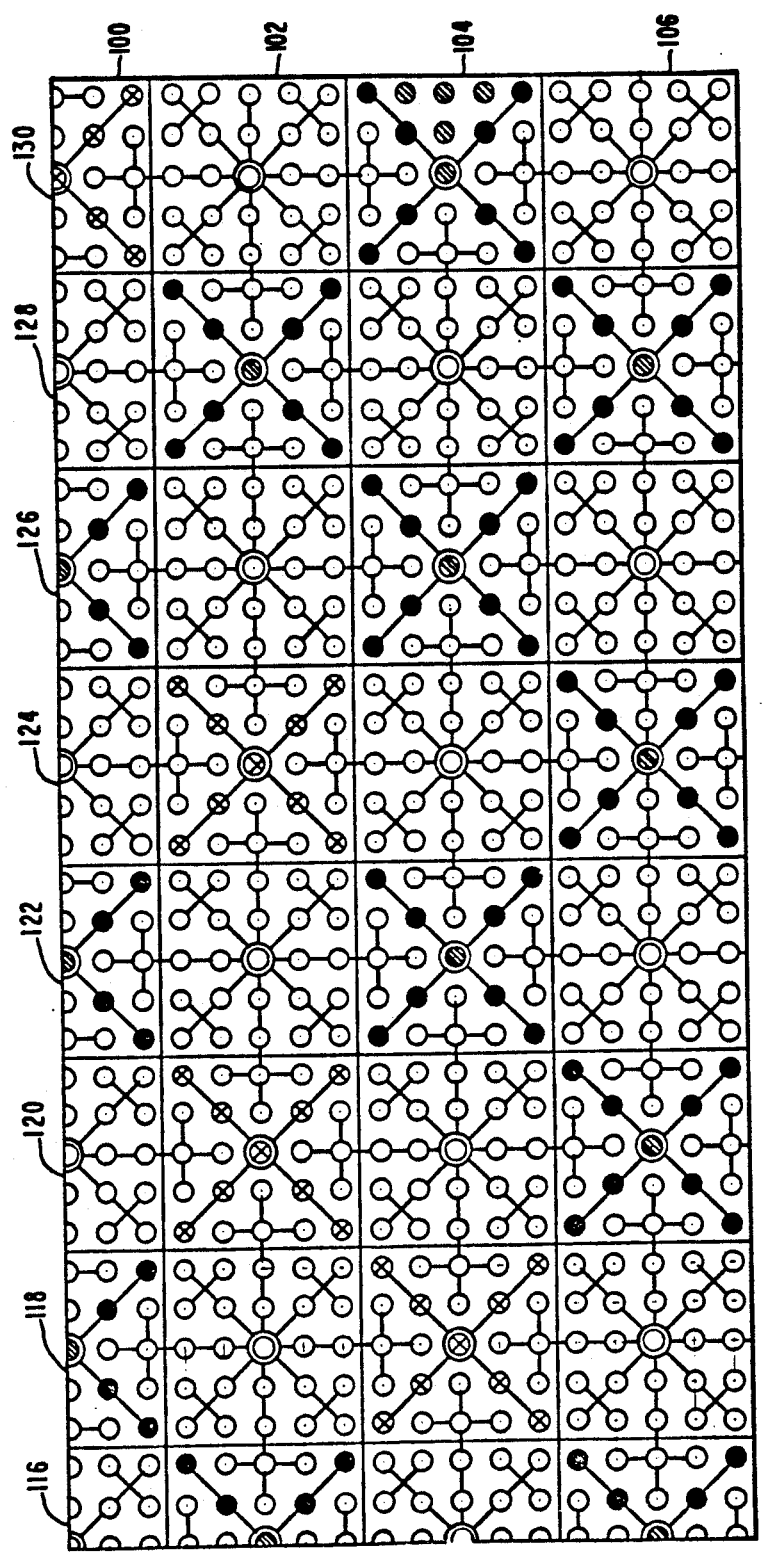
FIG. 8 is an enlarged view of a portion of the quarter core.

Referring now to FIGS. 7-11, the quarter core arrangement of fuel elements 48, displacer rods 40, control rods 80, gray rods 82, and unrodded locations 84 are shown. It is to be understood that the full reactor core configuration can be established by extrapolating the quarter core shown in FIG. 7. Actually, the quarter core shown in FIG. 7 is a mirror image of the eighth core taken along line A—A of FIG. 7. However, the quarter core of FIG. 7 is being shown for clarity.

Figure 10:
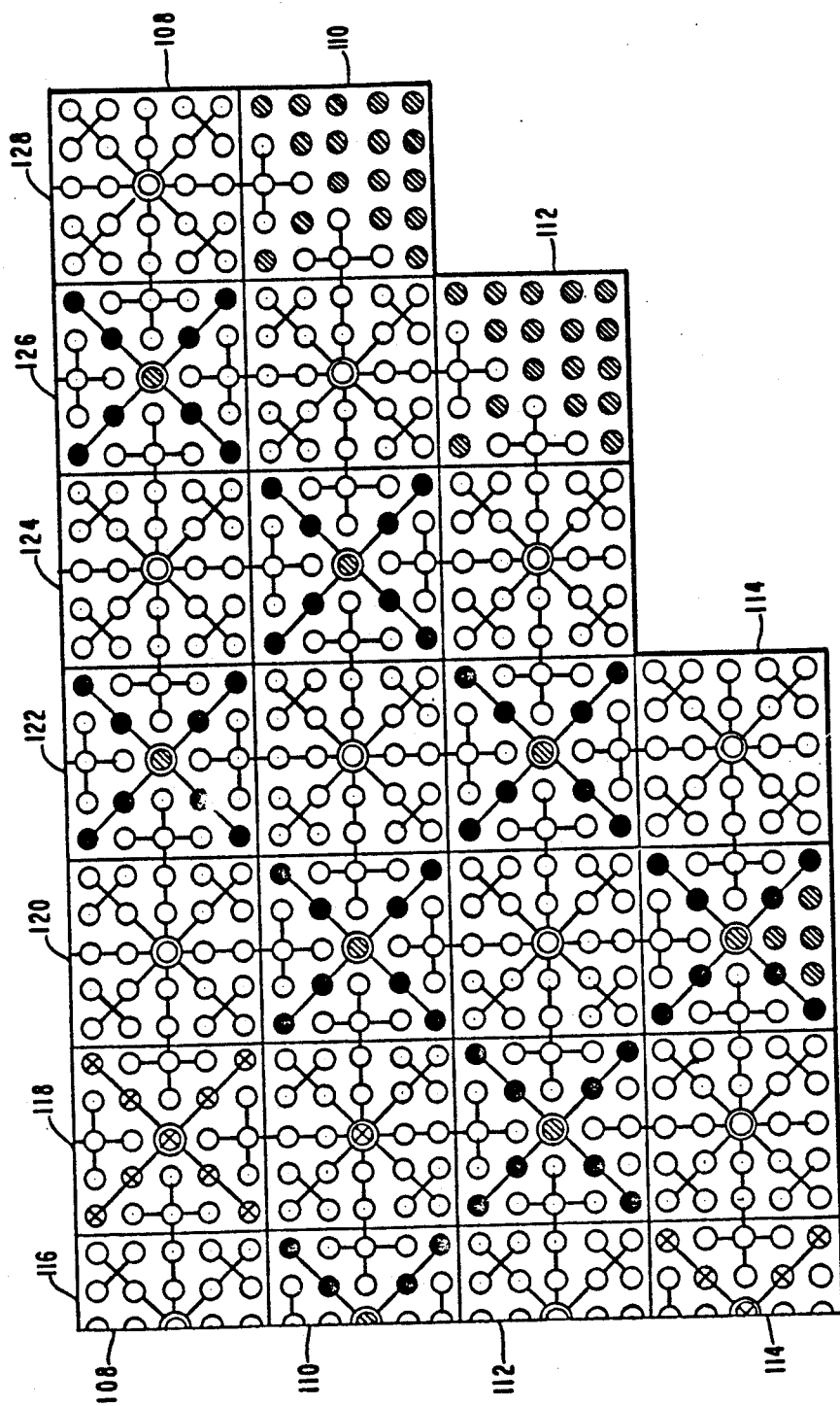
FIG. 10 is cross-sectional diagram of a typical fuel assembly.

As can be seen in FIG. 10, each fuel assembly 32 comprises an array of fuel elements 48 and an array of guide tubes 56. Generally, control rods 38 and gray rods 82 are used only in the diagonally arranged guide tubes 56 while displacer rods 40 are generally used in all guide tubes 56 of a given fuel assembly. In addition, an instrument tube 88 is provided near the center of each fuel assembly 32 for accommodating data instrumentation such as movable fission chambers. While each fuel assembly 32 is essentially identical to the one shown in FIG. 10, each fuel assembly 32 can produce a different function depending on whether guide tubes 56 are occupied by reactor coolant, displacer rods 40, control rods 80, or gray rods 82. Displacer rods 40 and gray rods 82 are generally chosen to be approximately the same size so as to displace approximately the same volume of water. However, gray rods 82 can be thick walled stainless steel cylindrical rods which can have higher worths per rod than do displace rods 40 so that they may be used to offset the effects of Xenon transients during load follow operations in addition to moderator displacement as described in copending U.S. Pat. application Ser. No. 217,061 filed herewith in the name of W. R. Carlson et al. entitled "Spectral Shift Reactor" and assigned to the Westinghouse Electric Corporation.

Figure 11:
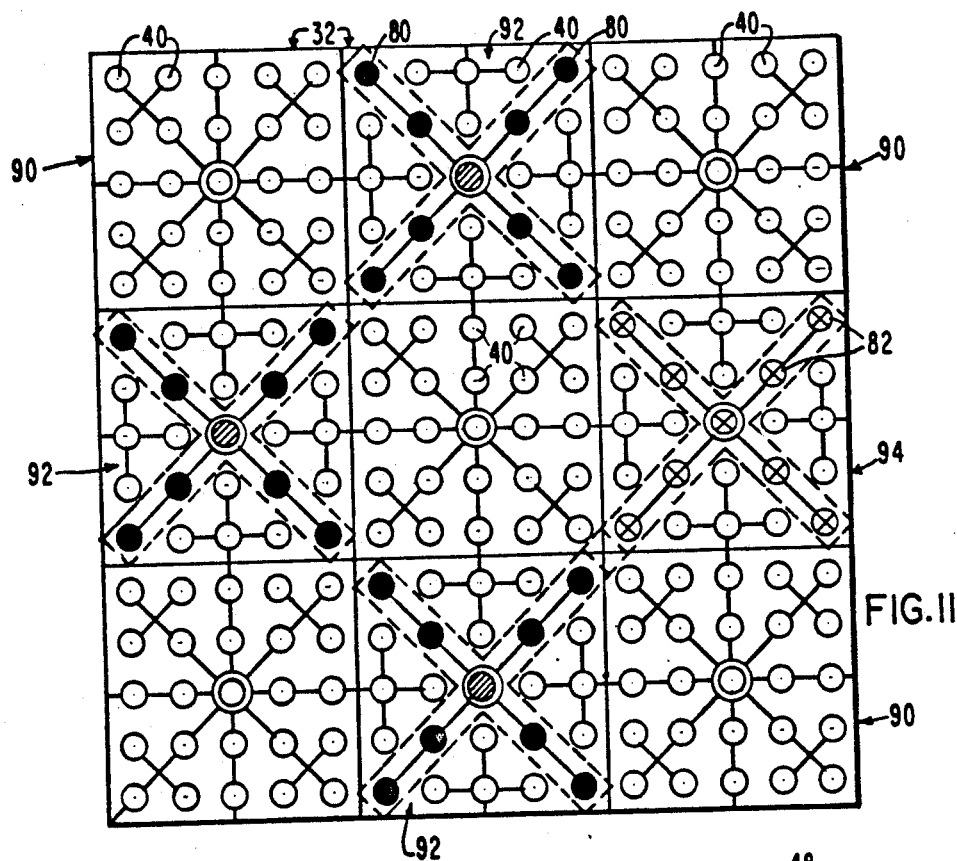
FIG. 11 is a diagram of a section of the core.
Figure 10:
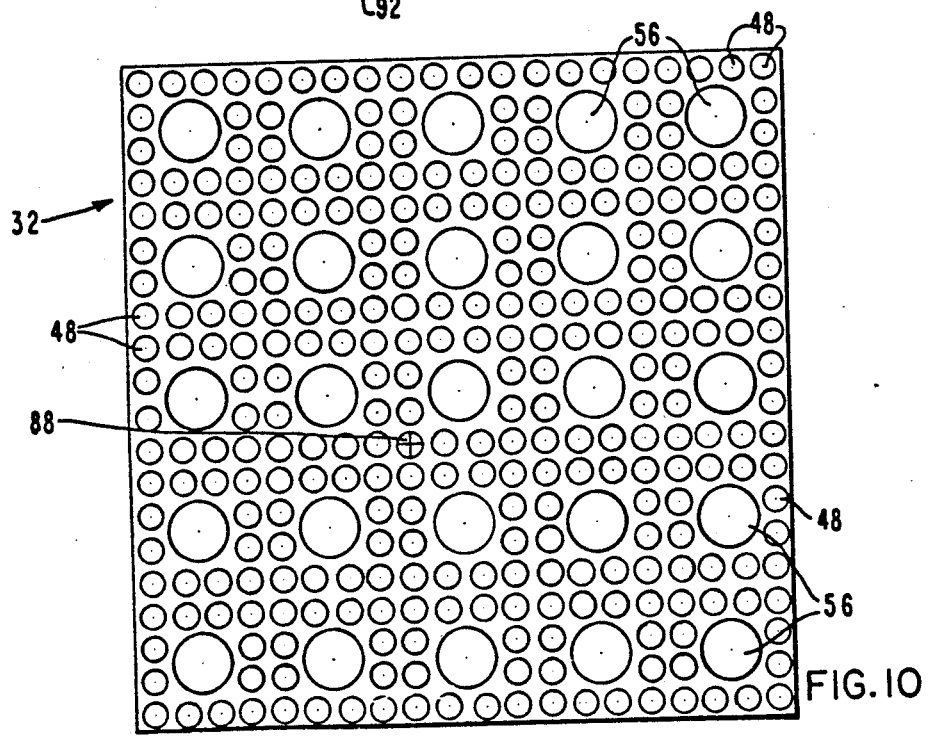

Referring now to FIG. 11, a fuel assembly 32 in which no control rods 80 or gray rods 82 are used and in which only displacer rods 40 are used in guide tubes 56 is referred to generally as displacer assembly 90. A fuel assembly 32 in which both displacer rods 40 and control rods 80 are employed (but no gray rods) is referred to as control assembly 92. Similarly, a fuel assembly 32 in which both displacer rods 40 and gray rods 82 are used is called a gray assembly 94. It should be noted that in FIG. 11 fuel elements 48 have been omitted for clarity and that those fuel assemblies are similar to those shown in FIG. 10.

Still referring to FIG. 11, each of the control rods 80 and gray rods 82 are attached to a spider (not shown) similar to spider 58 except that the spider for control rods 80 or gray rods 82 generally only effects one fuel assembly. In this manner, all control rods 80 or gray rods 82 in a given fuel assembly can be raised or lowered by a single drive mechanism. Furthermore, since each displacer rod spider 58 can extend into the adjacent fuel assemblies (as illustrated in the center portion of FIG. 11 and in FIG. 4), the displacer rod spider's 58 movement effects the control on five fuel assemblies and reduces the number of displacer rod drive mechanisms needed. Of course, on the periphery of the quarter core (as shown in FIG. 7) the particular spiders may move less than the usual number of rods because there are no adjacent fuel assemblies or there are unrodded locations 84.

Referring again to FIGS. 8 and 9 which comprise FIG. 7, a quarter core arrangement. Each row or partial row is numbered 100–114 and each column or partial column is numbered 116–130 and comprises:

| Fuel Assembly | |
|---|---|
| (100,116) | quarter displacer assembly |
| (100,118) | half control assembly |
| (100,120) | half displacer assembly |
| (100,122) | half control assembly |
| (100,124) | half displacer assembly |
| (100,126) | half control assembly |
| (100,128) | half displacer assembly |
| (100,130) | half gray assembly |
| (102,116) | half control assembly |
| (102,118) | full displacer assembly |
| (102,120) | full gray assembly |
| (102,122) | full displacer assembly |
| (102,124) | full gray assembly |
| (102,126) | full displacer assembly |

| Fuel Assembly | -continued |
| --- | --- |
| (102,128) | full control assembly |
| (102,130) | full displacer assembly |
| (104,116) | half displacer assembly |
| (104,118) | full gray assembly |
| (104,120) | full displacer assembly |
| (104,122) | full control assembly |
| (104,124) | full displacer assembly |
| (104,126) | full control assembly |
| (104,128) | full displacer assembly |
| (104,130) | partial control-unrodded assembly |
| (106,116) | half control assembly |
| (106,118) | full displacer assembly |
| (106,120) | full control assembly |
| (106,122) | full displacer assembly |
| (106,124) | full control assembly |
| (106,126) | full displacer assembly |
| (106,128) | full control assembly |
| (106,130) | full displacer assembly |
| (108,116) | half displacer assembly |
| (108,118) | full gray assembly |
| (108,120) | full displacer assembly |
| (108,122) | full control assembly |
| (108,124) | full displacer assembly |
| (108,126) | full control assembly |
| (108,128) | full displacer assembly |
| (110,116) | half control assembly |
| (110,118) | full displacer assembly |
| (110,120) | full control assembly |
| (110,122) | full displacer assembly |
| (110,124) | full control assembly |
| (110,126) | full displacer assembly |
| (110,128) | partial displacer unrodded assembly |
| (112,116) | half displacer assembly |
| (112,118) | full control assembly |
| (112,120) | full displacer assembly |
| (112,122) | full control assembly |
| (112,124) | full displacer assembly |
| (112,126) | partial displacer unrodded assembly |
| (114,116) | half gray assembly |
| (114,118) | full displacer assembly |
| (114,120) | partial control unrodded assembly |
| (114,122) | full displacer assembly |

As can be seen from the above description of the quarter core, the core configuration based on this concept can be illustrated generally as shown in FIG. 11. Basically, the fuel assembly in the center of the full core as represented by fuel assembly (100,116) in FIG. 7 can be chosen to be either a control assembly 92 or preferably a displacer assembly 90. Once this is chosen, the four fuel assemblies immediately adjacent to the flat sides of the center fuel assembly are chosen to be the other type and the fuel assembly on the diagonal are chosen to be the same type as the center assembly. This pattern is then continued in an alternating fashion. For example, the center fuel assembly (100,116) in FIG. 7 was chosen to be a displacer assembly 90 so that the fuel assemblies on its adjacent flat sides are chosen to be either control assemblies 92 or gray assemblies 94 while those on the diagonal are chosen to be displacer assemblies 90. This pattern is repeated in alternating fashion until the periphery of the core is reached where the end fuel assemblies may be chosen to be hybrid assemblies based on the nuclear physics of the particular core. Whether a particular assembly is chosen to be a control assembly 92 or a gray assembly 94 is determined by first selecting the number and location of control assemblies needed based on conventional core design. The remainder of the assemblies not chosen to be control assemblies 92 are then used as gray assemblies 94. Thus, substantially the entire core can be arranged on an alternating pattern of displacer assemblies and control or gray assemblies with practically all the fuel assemblies being served by at least one displacer rod spider 58 and with each displacer rod spider 58 serving generally 5 fuel assemblies. Moreover, each fuel assembly is served by at least one drive mechanism for either displacer rods, control rods or gray rods.

The illustrated core arrangement provides a means by which the neutron spectrum can be controlled in a "spectral shift" fashion by controlling the moderator volume in the core. This can be accomplished by displacing and replacing the water coolant in the core at appropriate times thereby changing the moderation of the core. In the present invention, displacer rods 40 and gray rods 82 can be used to effect this moderation change.

In operation, all displacer rods 40 and gray rods 82 are inserted in core 34 at the beginning of the core life. However, none of the control rods 80 need be inserted at that time. The insertion of displacer rods 40 and gray rod 82 is done by activating the appropriate drive mechanism such as displacer rod drive mechanism 38. When the drive mechanism is activated, displacer rods 40 and gray rods 82 fall into the appropriate guide tubes 56 in fuel assemblies 32. The displacer rods and gray rods will displace their volume of coolant (water) thus reducing the volume of moderator in core 34. The reduction of moderator hardens the neutron spectrum of the core and increases plutonium production. This hardening of the neutron spectrum is generally referred to as "spectral shift". The harder neutron spectrum reduces boron chemical shim requirements, results in a more negative moderator temperature coefficient, and reduces or eliminates burnable poison requirements. As the uranium fuel in the core is depleted over the life of the core, a certain number of displacer rods 40 and/or gray rods 82 may be withdrawn from the core by activating their respective drive mechanisms. The withdrawal of the rods allows more water-moderator into the core region and increases moderation of the core. This, in effect, introduces reactivity worth at a time when fuel depletion is causing a reactivity worth depletion. Thus, the reactivity of the core can be maintained at appropriate levels for a longer time. The withdrawal of the rods can continue at a selective rate (depending on core conditions) until, near the end of core life, all displacer rods 40 and all gray rods 82 have been withdrawn from the core. The selection and manipulation of the displacer rods can be chosen in the manner disclosed in copending U.S. patent application Ser. No. 217,054 filed herewith in the name of A. J. Impink entitled "Spectral Shift Reactor Control Method" and assigned to the Westinghouse Electric Corporation.

The displacer rods can be used at start-up to displace approximately 20% of the core water volume and can remain inserted until the boron shim concentration nears zero ppm which is approximately 60% into the fuel cycle. The use of displacer rods in this manner can result in approximately 10% reduction in uranium fuel requirements for a given core life which results in an 10% fuel cost savings. In addition, the use of burnable poison rods can be effectively eliminated, a further cost reduction.

Therefore, it can be seen that the invention provides a means to effectively control the reactivity of a nuclear reactor through moderator control by the use of displacer rods.

We claim as our invention:

1. A spectral shift pressurized-water reactor comprising:

a pressure vessel enclosing a reactor core which includes fissile material fuel, said pressure vessel having an inlet and an outlet for circulating water coolant moderator in heat transfer relationship with said core, said core comprising a plurality of square-shaped adjacent fuel assemblies vertically disposed therein for generating heat by nuclear fission, and said fuel assemblies having a fuel enrichment which provides a measure of excess reactivity at the beginning of core life which is later drawn upon to lengthen core life;

a plurality of substantially evenly spaced vertical guide tubes disposed in each of said fuel assemblies and adapted to have rod members moved therein and therefrom during reactor operation, and a portion of said guide tubes in each of said fuel assembly disposed in a cross-like configuration along the two diagonals which connect the corners of said square-shaped fuel assemblies;

three separate types of rods adapted to be moved into and out of said guide tubes, a first type of said rods comprising neutron-absorbing control rods so that insertion of said control rods into said core will substantially decrease reactivity and withdrawal of said control rods from said core will substantially increase reactivity, a second type of said rods comprising neutron-spectral-shift displacer rods which have lower absorptivity for neutrons than said control rods, the third type of said rods comprising gray rods which have an absorptivity for neutrons intermediate that of said control rods and said displacer rods, and said rods all having substantially the same cross-sectional dimension;

said gray rods and said control rods operable to be moved into and out of said core in a portion of said guide tubes which are positioned in said cross-like configuration, and said displacer rods operable to be moved into and out of substantially all of the remainder of said guide tubes, approximately half of said fuel assemblies operable to have only displacer rods moved therein and therefrom, those of said fuel assemblies into which only said displacer rods are to be moved being alternated in position in said core with those of said fuel assemblies into which said control rods and said gray rods are to be moved, and the total number of said displacer rods very substantially exceeding the total number of said control rods and said gray rods;

spider members and associated shafts and drive members therefor positioned above said core, a separate spider member provided for substantially all of each of said fuel assemblies, each of said spider members having only one type of said rods connected thereto in the form of arrays, said control rods and said gray rods being connected to said spider members as cross-like arrays to move into said guide tubes which are similarly disposed, and said displacer rods connected to said spider members as composite arrays which interfit into substantially all said guide tubes in a single fuel assembly in addition to those proximate guide tubes of adjacently positioned fuel assemblies so that those spiders which have displacer rods connected thereto service one fuel assembly in addition to proximate portions of those fuel assemblies which are positioned adjacent thereto.

2. The reactor as specified in claim 1, wherein the substantial majority of said fuel assemblies which have only displacer rods movable therein and therefrom are surrounded by four adjacent fuel assemblies, and those of said spiders and associated shafts and drives which serve said substantial majority of said fuel assemblies which have only displacer rods movable therein also control the movement of displacer rods into the proximate guide tubes of said four surrounding adjacent fuel assemblies.

3. The reactor as specified in claim 1, wherein the total number of said control rods substantially exceeds the total number of said gray rods.

4. The reactor as specified in claim 1, wherein said reactor has chemical shim control capability.

5. The reactor as specified in claim 1, wherein each of said spiders and associated shafts and drive members is separately controllable.

6. The reactor as specified in claim 1, wherein said displacer rods and said gray rods collectively have a sufficiently low absorption for neutrons that when all of said displacer rods and said gray rods are fully inserted into said core at the beginning of core life, supplemental neutron-absorption is required to control reactor operation.

7. A spectral shift pressurized-water reactor comprising:

a pressure vessel enclosing a reactor core which includes fissile material fuel, said pressure vessel having an inlet and an outlet for circulating water coolant moderator in heat transfer relationship with said core, said core comprising a plurality of square-shaped adjacent fuel assemblies vertically disposed therein for generating heat by nuclear fission, and said fuel assemblies having a fuel enrichment which provides a measure of excess reactivity at the beginning of core life which is later drawn upon to lengthen core life;

a plurality of spaced vertical guide tubes disposed in each of said fuel assemblies and adapted to have rod members moved therein and therefrom during reactor operation, and a portion of said guide tubes in each said fuel assembly disposed in a cross-like configuration along the two diagonals which contact the corners of said square-shaped fuel assemblies;

three separate types of rods adapted to be moved into and out of said guide tubes, a first type of said rods comprising neutron-absorbing control rods so that insertion of said control rods into said core will substantially decrease reactivity and withdrawal of said control rods from said core will substantially increase reactivity, a second type of said rods comprising neutron-spectral-shift displacer rods which have a lower absorptivity for neutrons than said control rods, the third type of said rods comprising gray rods which have an absorptivity for neutrons intermediate that of said control rods and said displacer rods, and said control rods and said displacer rods and said gray rods when inserted into said core displacing an equivalent volume of said water coolant moderator;

said displacer rods and said gray rods adapted to be fully inserted into said core at the beginning of core life, and said displacer rods and said gray rods collectively have a sufficiently low absorption for neutrons that when all of said displacer rods and said gray rods are fully inserted into said core at the beginning of core life, supplemental neutron absorption is required to control reactor operation;

said gray rods and said control rods operable to be moved into and out of said core in a portion of said guide tubes which are positioned in said cross-like configuration, and said displacer rods operable to be moved into and out of substantially all of the remainder of said guide tubes, approximately half of said fuel assemblies operable to have only displacer rods moved therein and therefrom, those of said fuel assemblies into which only said displacer rods are to be moved being alternated in position in said core with those of said fuel assemblies into which said control rods and said gray rods are to be moved, the volume of said water coolant moderator which is displaced by said displacer rods when fully inserted into said core very substantially exceeding the total volume of said water coolant moderator displaced by said control rods and said gray rods when fully inserted into said core, and the volume of said water coolant moderator which is displaced by said control rods if fully inserted into said core substantially exceeding the volume of said water coolant moderator displaced by said gray rods when fully inserted into said core;

spider members and associated shafts and drive members therefor positioned above said core, a separate spider member provided for substantially all of each of said fuel assemblies, each of said spider members having only one type of said rods connected thereto in the form of arrays, said control rods and said gray rods being connected to said spider members as cross-like arrays to move into said guide tubes which are similarly disposed, and said displacer rods connected to said spider members as composite arrays which interfit into substantially all said guide tubes in a single fuel assembly in addition to those proximate guide tubes of adjacently positioned fuel assemblies so that those spiders which have displacer rods connected thereto serve one fuel assembly in addition to proximate portions of those fuel assemblies which are positioned adjacent thereto.

8. The reactor as specified in claim 7, wherein the substantial majority of said fuel assemblies which have only displacer rods movable therein and therefrom are surrounded by four adjacent fuel assemblies, and those of said spiders and associated shafts and drives which serve said substantial majority of said fuel assemblies which have only displacer rods movable therein also control the movement of displacer rods into the proximate guide tubes of said four surrounding adjacent fuel assemblies.

9. The reactor as specified in claim 7, wherein said displacer rods are formed of Zircaloy tubes with or without a filling of low-neutron-absorbing solid pellets or annular pellets.

10. The reactor as specified in claim 9, wherein said solid pellets or annular pellets are $ZrO_2$ or $Al_2O_3$.

11. The reactor as specified in claim 9, wherein said gray rods comprise hollow stainless steel tubes.

12. The reactor as specified in claim 7, wherein said reactor has chemical shim control capability.

13. The reactor as specified in claim 7, wherein each of said spiders and associated shafts and drive members is separately controllable.

14. A spectral shift pressurized-water reactor comprising:

a pressure vessel enclosing a reactor core which includes fissile material fuel, said pressure vessel having an inlet and an outlet for circulating water coolant moderator in heat transfer relationship with said core, said core comprising a plurality of square-shaped adjacent fuel assemblies vertically disposed therein for generating heat by nuclear fission, and said fuel assemblies having a fuel enrichment which provides a measure of excess reactivity at the beginning of core life which is later drawn upon to lengthen core life;

a plurality of substantially evenly spaced vertical guide tubes disposed in each of said fuel assemblies and adapted to have rod members moved therein and therefrom during reactor operation, and a portion of said guide tubes in each said fuel assembly disposed in a cross-like configuration along the two diagonals which connect the corners of said square-shaped fuel assemblies;

three separate types of rods adapted to be moved into and out of said guide tubes, a first type of said rods comprising neutron-absorbing control rods so that insertion of said control rods into said core will substantially decrease reactivity and withdrawal of said control rods from said core will substantially increase reactivity, a second type of said rods comprising displacer rods which have a substantially lower absorptivity for neutrons than said control rods, each said neutron-spectral-shift displacer rod comprising a hollow thin-walled Zircaloy member containing a filling of solid or annular zirconium- or aluminum-containing material for providing internal support and mass for said thin-walled tubular member, each said displacer rod having overall neutron-absorbing and -moderating characteristics essentially not exceeding those of hollow tubular Zircaloy members with or without a filling of zirconium oxide pellets or aluminum oxide pellets, the third type of said rods comprising gray rods which have an absorptivity for neutrons intermediate that of said control rods and said displacer rods, and said rods all having substantially the same cross-sectional dimensions;

said gray rods and said control rods operable to be moved into and out of said core in a portion of said guide tubes which are positioned in said cross-like configuration, and said displacer rods operable to be moved into and out of substantially all of the remainder of said guide tubes, approximately half of said fuel assemblies operable to have only displacer rods moved therein and therefrom, those of said fuel assemblies into which only said displacer rods are to be moved being alternated in position in said core with those of said fuel assemblies into which said control rods and said gray rods are to be moved, and the total number of said displacer rods very substantially exceeding the total number of said control rods and said gray rods;

spider members and associated shafts and drive members therefor positioned above said core, a separate spider member provided for substantially all of each of said fuel assemblies, each of said spider members having only one type of said rods connected thereto in the form of arrays, said control rods and said gray rods being connected to said spider members as cross-like arrays to move into said guide tubes which are similarly disposed, and said displacer rods connected to said spider members as composite arrays which interfit into substantially all said guide tubes in a single fuel assembly in addition to those proximate guide tubes of adjacently positioned fuel assemblies so that those spider members which have displacer rods connected thereto serve one fuel assembly in addition to proximate portions of those fuel assemblies which are positioned adjacent thereto.

15. The reactor as specified in claim 14, wherein the substantial majority of said fuel assemblies which have only displacer rods movable therein and therefrom are surrounded by four adjacent fuel assemblies, and those of said spider members and associated shafts and drives which serve said substantial majority of said fuel assemblies which have only displacer rods movable therein also control the movement of displacer rods into the proximate guide tubes of four adjacent fuel assemblies.

16. The reactor as specified in claim 14, wherein the total number of said control rods substantially exceeds the total number of said gray rods.

17. The reactor as specified in claim 14, wherein said reactor has chemical shim control capability.

18. The reactor as specified in claim 14, wherein each of said spider members and associated shafts and drive members is separately controllable.

19. The reactor as specified in claim 14, wherein said gray rods comprise hollow stainless steel tubes.

20. A spectral shift pressurized-water reactor comprising:
   a pressure vessel enclosing a reactor core which includes fissile material fuel, said pressure vessel having an inlet and an outlet for circulating water coolant moderator in heat transfer relationship with said core, said core comprising a plurality of square-shaped adjacent fuel assemblies vertically disposed therein for generating heat by nuclear fission, and said fuel assemblies having a fuel enrichment which provides a measure of excess reactivity at the beginning of core life which is later drawn upon to lengthen core life;
   a plurality of spaced vertical guide tubes disposed in each of said fuel assemblies and adapted to have rod members moved therein and therefrom during reactor operation, and a portion of said guide tubes in each said fuel assembly disposed in a cross-like configuration along the two diagonals which connect the corners of said square-shaped fuel assemblies;
   three separate types of rods adapted to be moved into and out of said guide tubes, a first type of said rods comprising neutron-absorbing control rods so that insertion of said control rods into said core will substantially decrease reactivity and withdrawal of said control rods from said core will substantially increase reactivity, a second type of said rods comprising neutron-spectral-shaft displacer rods which have a substantially lower absorptivity for neutrons than said control rods, each said neutron-spectral-shift displacer rod comprising a hollow thin-walled Zircaloy member containing a filling of solid or annular zirconium- or aluminum-containing material for providing internal support and mass for said thin-walled tubular member, each said displacer rod having overall neutron-absorbing and -moderating chracteristics essentially not exceeding those of hollow tubular Zircaloy members with or without a filling of zirconium oxide pellets or aluminum oxide pellets, the third type of said rods comprising gray rods which have an absorptivity for neutrons intermediate that of said control rods and said displacer rods, and said control rods and said displacer rods and said gray rods when inserted into said core displacing an equivalent volume of said water coolant moderator;
   said displacer rods and said gray rods adapted to be fully inserted into said core at the beginning of core life, and said displacer rods and said gray rods collectively have a sufficiently low absorption for neutrons that when all of said displacer rods and said gray rods are fully inserted into said core at the beginning of core life, supplemental neutron absorption is required to control reactor operation;
   said gray rods and said control rods operable to be moved into and out of said core in a portion of said guide tubes which are positioned in said cross-like configuration, and said displacer rods operable to be moved into and out of substantially all of the remainder of said guide tubes, approximately half of said fuel assemblies operable to have only displacer rods moved therein and therefrom, those of said fuel assemblies into which only said displacer rods are to be moved being alternated in position in said core with those of said fuel assemblies into which said control rods and said gray rods are to be moved, the volume of said water coolant moderator which is displaced by said displacer rods when fully inserted into said core very substantially exceeding the total volume of said water coolant moderator displaced by said control rods and said gray rods if fully inserted into said core, and the volume of said water coolant moderator which is displaced by said control rods if fully inserted into said core substantially exceeding the volume of said water coolant moderator displaced by said gray rods when fully inserted into said core;
   spider members and associated shafts and drive members therefor positioned above said core, a separate spider member provided for substantially all of each of said fuel assemblies, each of said spider members having only one type of said rods connected thereto in the form of arrays, said control rods and said gray rods being connected to said spider members as cross-like arrays to move into said guide tubes which are similarly disposed, and said displacer rods connected to said spider members as composite arrays which interfit into substantially all said guide tubes in a single fuel assembly in addition to those proximate guide tubes of adjacent positioned fuel assemblies so that those spider members which have displacer rods connected thereto serve one fuel assembly in addition to proximate portions of those fuel assemblies which are positioned adjacent thereto.

21. The reactor as specified in claim 20, wherein the substantial majority of said fuel assemblies which have only displacer rods movable therein and therefrom are surrounded by four adjacent fuel assemblies, and those of said spider members and associated shafts and drives which serve said substantial majority of said fuel assemblies which have only displacer rods movable therein also control the movement of displacer rods into the proximate guide tubes of said four surrounding adjacent fuel assemblies.

22. The reactor as specified in claim 20, wherein said gray rods comprise hollow stainless steel tubes.

23. The reactor as specified in claim 20, wherein said reactor has chemical shim control capability.

24. The reactor as specified in claim 20, wherein each of said spider members and associated shafts and drive members is separately controllable.

* * * * *